US006909575B2

(12) United States Patent
Soyama et al.

(10) Patent No.: US 6,909,575 B2
(45) Date of Patent: Jun. 21, 2005

(54) MAGNETIC DISK DRIVE AND CONTROL METHOD THEREOF

(75) Inventors: Yoshio Soyama, Odawara (JP); Yuji Hata, Odawara (JP); Katsumoto Onoyama, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 121 days.

(21) Appl. No.: 10/199,233

(22) Filed: Jul. 19, 2002

(65) Prior Publication Data
US 2003/0048571 A1 Mar. 13, 2003

(30) Foreign Application Priority Data
Sep. 10, 2001 (JP) ........................................ 2001-272997

(51) Int. Cl.[7] ............................................ G11B 5/596
(52) U.S. Cl. ..................................... 360/78.06; 360/75
(58) Field of Search .......................... 360/78.06, 78.04, 360/75

(56) References Cited

U.S. PATENT DOCUMENTS

| 5,594,603 A | * | 1/1997 | Mori et al. | ............... | 360/78.04 |
| 5,844,743 A | * | 12/1998 | Funches | .................. | 360/78.04 |
| 6,690,536 B1 | * | 2/2004 | Ryan | ........................ | 360/78.04 |

FOREIGN PATENT DOCUMENTS

| JP | 06-119008 | 4/1994 |
| JP | 11-341850 | 12/1999 |
| JP | 2000-222837 | 8/2000 |

* cited by examiner

Primary Examiner—Andrew L. Sniezek
Assistant Examiner—Mitchell Slavitt
(74) Attorney, Agent, or Firm—Townsend and Townsend and Crew LLP (57) ABSTRACT

In a magnetic disk drive that performs the seek operation of a magnetic head by a VCM, a characteristic that is excellent in fault tolerance that will not generate a fault in severe environment, such as a high temperature and the issue of high frequency command without requiring a special device and special operation and without deteriorating access performance.

For this purpose, a VCM current and a VCM voltage are measured and VCM back electromotive force is calculated based on both results. At seek operation, position information located on a magnetic disk is sampled and a traveling velocity is detected from the difference of the sampled result. VCM coil temperature is estimated from the difference between the traveling velocity and the VCM back electromotive force. The magnetic disk drive moves low velocity seek mode when the estimated value of this VCM coil temperature exceeded a specified value.

17 Claims, 6 Drawing Sheets

MAGNETIC DISK DRIVE AND CONTROL METHOD THEREOF

BACKGROUND OF THE INVENTION

1. Field of the Invention

The present invention relates to a magnetic disk drive, and, more particularly, to a magnetic disk drive that ensures excellent fault tolerance by preventing an excessive rise in coil temperature of a voice coil motor (hereinafter referred to as "VCM") even when there is frequent access of data to a magnetic disk at high temperature in the magnetic disk dive that performs the seek operation of a magnetic head by the VCM.

2. Description of the Related Art

To prevent the heating of a motor, various arts have been known before as a means for controlling a general motor. For example, the "motor controller" disclosed in the Japanese Patent Laid-Open No. Hei 11-341850 detects a current that is supplied to the motor and incorporates the current in the CPU, then compares the current with several reference temperatures. The rotational velocity of the motor is adjusted by adjusting the rotational speed of the motor based on the result, thereby preventing the heating of the motor.

In a general magnetic disk drive, a VCM has been used as a mechanism for moving a magnetic head to a predetermined track. A control means for preventing the heating of the motor must also be provided in this VCM when the magnetic disk drive is frequently accessed. The magnetic disk drive that uses the VCM introduces the following digital control system. That is, the magnetic disk drive reads position information recorded on the magnetic disk at equal time intervals in the circumferential direction to position the magnetic head for data access in a desired track and transfers the position information to the CPU, then performs predetermined operation. A D/A converter converts an operation result to an analog signal. A VCM AMP converts this voltage to a current and applies the current to the VCM.

Besides, the operation that moves a magnetic head to an object track is called "seek operation" and the state in which data read and write is being executed in an object track or remains stationary and is positioning is called "following operation" here.

A magnetic field is applied to the VCM by a magnet arranged in the vicinity in this manner. When the VCM AMP makes a current flow in the VCM for positioning operation, drive force that propels an actuator is generated by electromagnetic induction, thereby enabling the seek operation that moves the magnetic head to the predetermined track. At seek operation, a coil moves in a magnetic field, back electromotive force (hereinafter referred to as "BEMF") that is proportional to the traveling velocity occurs.

The BEMF is calculated from (Equation 1).

$$BEMF = Vvcm - Ivcm \times Rvcm \quad \text{(Equation 1)}$$

Where,
Vvcm: VCM both-end voltage
Ivcm: Current flowing in a VCM
Rvcm: Coil resistance of a VCM The BEMF can be calculated from the aforementioned (Equation 1) if the VCM voltage and the VCM current can be measured regarding the VCM coil resistance as a constant. However, the VCM coil resistance varies with the heat dissipation when the supply of a high VCM current by the seek operation and the ambient temperature of a magnetic disk drive. The VCM coil resistance is generally expressed by (Equation 2).

$$Rvcm = R20 \times (1 + C \times \Delta t) \quad \text{(Equation 2)}$$

Where,
R20: VCM coil resistance when the VCM ambient temperature is 20° C.
C: Temperature sensitivity constant
Δt: Temperature difference of 20° C. with the VCM coil temperature Because the VCM coil resistance has temperature sensitivity like this, a slight error occurs. If the VCM coil resistance (Rvcm) can be measured, however, Δt can be calculated back by transforming (Equation 2), thereby also enabling acquisition of the VCM temperature.

On the other hand, some magnetic disk drives have a load and unload mechanism that shunts a magnetic head to an area on the outer circumference than a disk surface if the power of the magnetic disk drives is not supplied when a spindle motor that rotates a disk is in a stopped state except in the read and write operation.

In this case, to enter a normal ready state from an unready state, the load operation in which an actuator is moved from the shunting position to the disk surface must be controlled. And to enter the unready state from the normal ready state, the unload operation in which the actuator is moved from the disk surface to the shunting position must be controlled, too. Positioning information are recorded on the disk surface. As described above, when the magnetic head is shunt from the disk surface, the positioning information cannot be read, thereby disabling positioning control, such as normal seek operation. Accordingly, velocity control is performed by detecting the BEMF that is proportional to the traveling velocity of the actuator expressed in (Equation 1). In such case, the magnetic disk drive is necessarily provided with a VCM current detection circuit and a VCM voltage detection circuit.

When the VCM coil resistance varies with a temperature change, the sensitivity of the BEMF to be detected differs. Accordingly, the VCM coil resistance must previously be learned. In this method, for example, as the art described in the Japanese Patent Laid-Open No. 2000-222837, the actuator is pushed against the external-surface stopper at the load operation and the VCM current is supplied. At that time, because the traveling velocity=0, it follows that BEMF=0. The VCM coil resistance can be learned by calculating the following equation in the transformation of (Equation 1).

$$Rvcm = Vvcm / Ivcm \quad \text{(Equation 3)}$$

For the unload operation, the same measurement may be made by pushing the actuator against the internal-surface stopper.

Hereupon, the problem the present invention is attempting to solve is described below.

As described above, the VCM coil resistance has temperature sensitivity and varies with the seek operation and ambient temperature. Hereupon, the data access pattern of a magnetic disk drive differs in sequential access and random access, and there are various access data lengths in one command. In case of a VCM, the severest pattern is a short access data and the amount of VCM current required for the seek operation per hour is high. Specifically, in this case, deceleration current is supplied when the data length is 1 or 0 sector and seek operation reaches the specified maximum velocity continuing making the current that accelerates an actuator flow.

Figure 7:
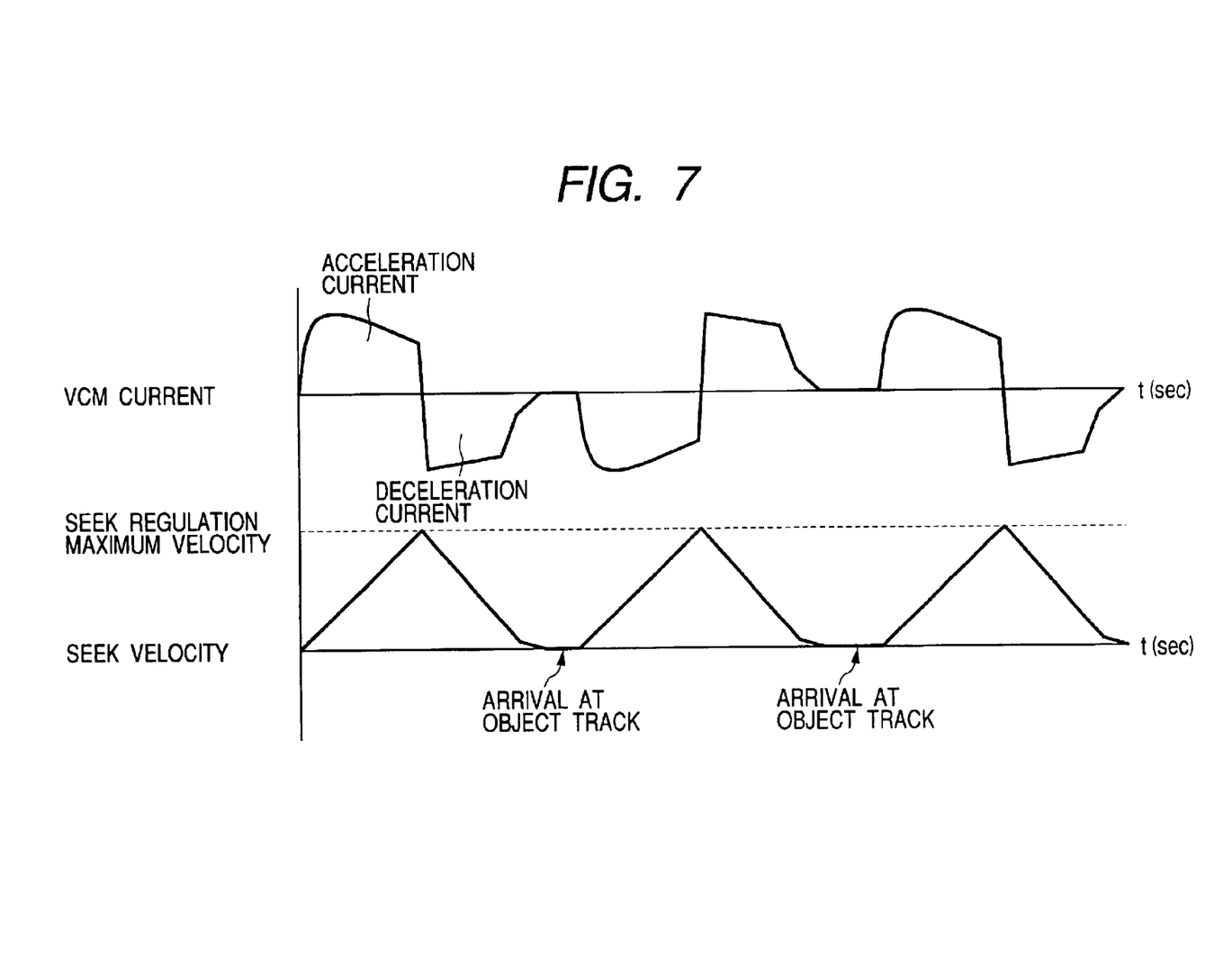
FIG. 7 is a drawing showing the general relationship between the VCM current and seek velocity.

Hereupon, the relationship between the VCM current and the seek velocity at that time is shown in FIG. 7. FIG. 7 is a diagram showing the general relationship between the VCM current and the seek velocity.

When a command continues and is issued at high frequency in this manner, the VCM current continues being supplied and the VCM coil temperature will rise extremely. When the ambient temperature of the drive is high, the temperature will further be raised.

At the VCM coil temperature, a temperature change does not occur steeply in the one-time seek operation, but slowly changes by the execution of multiple times of seek operations. In general, a severe seek continues several 10 ms or more and a measurable temperature change appears. When this severe state further continues, the heat resistance temperature of a mechanism component is exceeded and the characteristics of a functional component vary, thereby causing a fault to occur. Concerning such symptom, for example, as described in the Japanese Patent Laid-Open No. Hei 6-119008, when a temperature sensor is provided inside the drive and a specified value is exceeded, there is a method of stopping operation.

The problem was, however, that, in actual, a real temperature and a measured value differ frequently according to the mounting location of the temperature sensor and this is not necessarily suitable for being used to prevent a fault.

When the VCM coil temperature rises, the coil resistance increases and the amount of acceleration current decreases during seek control, thereby decreasing acceleration capability. That the traveling capability of a mechanism system decreased is detected by measuring the traveling distance of the fixed section of an acceleration section using this characteristic. If this traveling distance is below a fixed value, a method for switching the seek control at low velocity and suppressing the heat dissipation of the VCM is also known.

However, this method may not be able to estimate the VCM coil temperature correctly because the acceleration capability varies with the power supply voltage, thereby fluctuating the power supply voltage.

As described in the Japanese Patent Laid-Open No. 2000-222837, a magnetic disk drive that performs measurement operation by pushing an actuator against the external-surface stopper or internal-surface stopper for the measurement of VCM coil resistance is known.

In the measurement of this VCM coil resistance, however, a considerable amount of measurement time including the traveling time from the current position to the stopper, measurement time when the actuator is pushed against the stopper, and the traveling time to the next command position are required. In this method, if the rise of the VCM coil temperature is set as a problem when a high frequency instruction continues, this command itself is suspended and the stopper pushing operation for measuring the coil resistance must be executed. Consequently, access performance will deteriorate considerably. Moreover, this Japanese Patent Laid-Open No. 2000-222837 also describes that the measurement of the VCM coil resistance is executed in a "following" state. In actual, a small amount of the VCM current can be found in the "following" state. When the method of A/D-converting the VCM current via the VCM current detection AMP is used, an A/D conversion value reaches an extremely small amount in comparison with the resolution. Accordingly, a measurement result with good accuracy is difficult to obtain.

The art described in the Japanese Patent Laid-Open No. Hei 11-341850 of the aforementioned prior art controls a motor in which the amount of current and the heating temperature of the motor are simply proportional, but there is a problem that this art is hard to apply to the VCM. This is because an object of the VCM is to position a head. Accordingly, when a current flows in a short time and will not flow immediately, a pattern is repeated periodically. As a result, the mere detection of the VCM current is difficult to couple with the cause of a motor temperature rise. In this point, it is expected that a VCM for a magnetic disk drive should be controlled in line with the actual circumstances when the traveling velocity for a fixed period is considered.

The present invention is made under such circumstances and it is therefore a future of the present invention to provide a magnetic disk drive having excellent fault tolerance that will not generate a fault even in such severe environment as the issue of a high humidity and high frequency command by estimating the VCM coil temperature itself and, as a result, moving to the seek control mode that suppresses an excessive temperature rise without using a special device, such as a temperature sensor, and requiring a special operation for the measurement of the VCM coil temperature and deteriorating access performance.

BRIEF SUMMARY OF THE INVENTION

The control method of a magnetic disk drive that performs seek operation by a VCM for positioning a magnetic head of the present invention in a predetermined track, first, measures the VCM current supplied to the VCM and the VCM voltage applied to both ends of the VCM. Subsequently, based on this measurement result, BEMF is calculated. At seek operation, the position information located on the magnetic disk is sampled. The traveling velocity of the magnetic disk is detected from the difference of the position information of this sample result and the VCM coil temperature is estimated from the difference between the detected traveling velocity and the calculated BEMF. Further, when this estimated coil temperature exceeds a specified value, the VCM is made to move to the low velocity seek mode.

BRIEF DESCRIPTION OF SEVERAL VIEWS OF DRAWING

Preferred embodiments of the present invention will be described in detail based on the followings, wherein.

DETAILED DESCRIPTION OF THE INVENTION

Embodiments according to the present invention are described below with the reference to FIGS. 1 to 6.

[Estimation Method of the VCM Coil Temperature and Transition to Low Velocity Seek Mode]

First, the estimation method of the coil temperature of a VCM that is a basic idea of the present invention and an overview of the transition to the low velocity seek mode are described.

Figure 4:
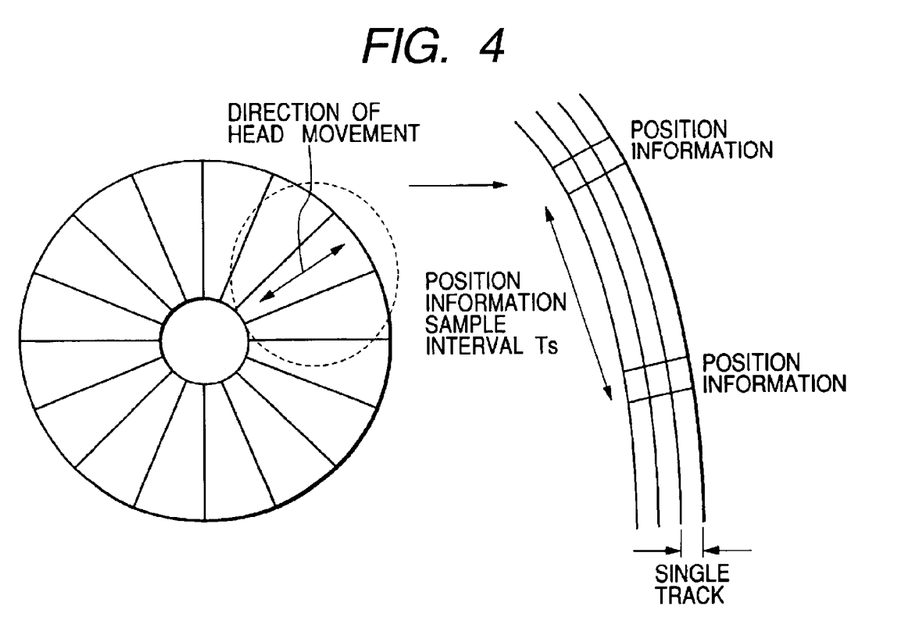
FIG. 4 is a drawing for describing a magnetic disk and the position information located on it.

In general, the mechanism that performs the seek control of a magnetic disk drive is constituted of a velocity control system. For the detection of the traveling velocity in this case, as shown in FIG. 4 later, in most cases, the position information that is arranged on a magnetic disk surface at equal intervals in the circumferential direction and radially in the radial direction is sampled and the difference between the samples is used as the traveling velocity. This detection velocity is calculated from a track on which a magnetic head moves actually. This velocity detection method is fixed in sensitivity regardless of temperature environment and voltage environment and high in accuracy.

On the other hand, BEMF can be operated even in seek operation and an error ΔBEMF due to a VCM coil temperature change is contained. The BEMF detected in the state containing the VCM coil temperature change appears as (Equation 4).

Moreover, the error ΔBEMF is expressed in (Equation 5).

$$(BEMF+\Delta BEMF)=Vvcm-Ivcm\times(Rvcm+\Delta Rvcm) \quad \text{(Equation 4)}$$

$$\Delta BEMF=Ivcm\times\Delta Rvcm \quad \text{(Equation 5)}$$

Where,
ΔRvcm: Variation due to a temperature change of the VCM coil resistance
ΔBEMF: BEMF detection error due to the effect of ΔRvcm If the detection velocity for seek control and the detection sensitivity of the BEMF are combined here and the difference is obtained, the error of the BEMF due to a temperature change is extracted as expressed in Equation (6).

$$\Delta BEMF=\text{Velocity}-BEMF \quad \text{(Equation 6)}$$

Where,
Velocity: Traveling velocity signal detected for seek control

The ground on which this (Equation 6) is established is the following (Equation 7).

$$BEMF=Kf\times\text{traveling velocity} \quad \text{(Equation 7)}$$

Where,
Kf: Drive thrust constant [N/A] per current applied to the VCM

Kf also includes temperature sensitivity in the same manner as Rvcm here. In comparison with the VCM coil, the temperature sensitivity is sufficiently low and can be ignored because it is known that the temperature itself will also not rise to the temperature at which the predetermined temperature is added to the ambient temperature of the drive. That is, approximately, the BEMF may be assumed to be primarily proportional to the traveling velocity of seek operation.

When the error ΔBEMF of the BEMF obtained in seek operation in (Equation 6) is substituted for (Equation 5) and transformed, a resistance error can be obtained as expressed in the following (Equation 8).

$$\Delta Rvcm=\Delta BEMF/Ivcm \quad \text{(Equation 8)}$$

From these (Equation 8) and (Equation 2), the following (Equation 9) is obtained.

$$\Delta t = \Delta Rvcm/R20\times C) \quad \text{(Equation 9)}$$
$$= (\Delta BEMF/Ivcm)/(R20\times C)$$

Accordingly, a temperature difference from 20° C. can be extracted and the VCM coil temperature can be estimated.

The magnetic disk drive of the present invention monitors the ΔRvcm obtained in (Equation 8). On reaching the predetermined temperature that will exceed the heat resistance temperature of the VCM coil portion, the magnetic disk-drive decreases the seek traveling velocity and moves to the low velocity seek mode that suppresses the heat dissipation of the VCM. Further, on decreasing below the predetermined temperature, the magnetic disk drive returns to the normal seek mode.

As a result, a magnetic disk drive having excellent fault tolerance that will not exceed the heat resistance temperature of the VCM coil portion can be realized by monitoring the VCM coil temperature in this manner.

[Embodiment 1]

A first embodiment according to the present invention is described below with reference to FIGS. 1 to 5.

First, the configuration of a magnetic disk drive according to the present invention is described with reference to FIG. 1.

Figure 1:
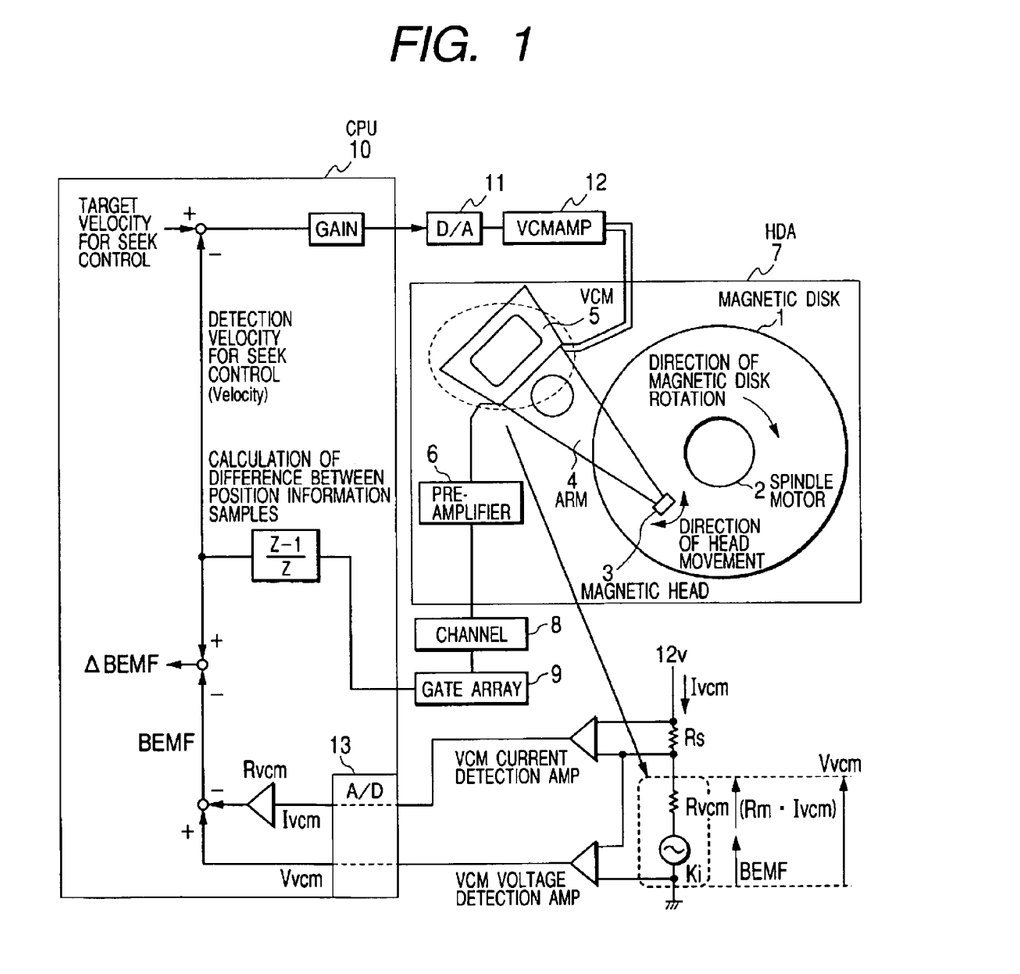
FIG. 1 is a block diagram of a magnetic disk drive according to the present invention.

FIG. 1 is a block diagram of the magnetic disk drive according to the present invention.

The magnetic disk drive of the present invention that records data and follows rotary operation is concentrated in an HDA (head disk assembly) 7. The HDA 7 includes of a magnetic disk 1, a spindle motor 2, a magnetic head 3, an arm 4, a VCM 5, and a preamplifier 6.

The spindle motor 2 rotates the magnetic disk 1. The magnetic head 3 records digital information and performs reproduction operation on the magnetic disk 1. The arm 4 supports the magnetic head 1 and the VCM 5 drives the magnetic head 1 via this arm 4. The preamplifier 6 is an amplifier that amplifies the data and position information read by the magnetic head 1.

The magnetic disk drive of the present invention has a channel 8, a gate array 9, a CPU 10, a D/A converter 11, and a VCM AMP 12.

The channel 8 demodulates the data and position information read from the preamplifier 6 into a digital signal. The gate array 9 transfers the position information obtained from this channel 8 to the CPU 10. The CPU 10 calculates a manipulated variable for positioning control based on the position information transferred from the gate array 9. The D/A converter 11 converts a digital quantity and an analog quantity. The VCM AMP 12 supplies the current to the VCM. The calculation result of the manipulated variable from the CPU 10 is converted to an analog signal by the D/A converter 11 and voltage-to-current-converted by the VCM AMP 12. Consequently, a control system in which a current is supplied to the VCM 5 and the magnetic head 3 is driven is formed.

Next, the procedure of calculating the VCM coil temperature of the present invention is described with reference to FIGS. 2 to 4.

Figure 2:
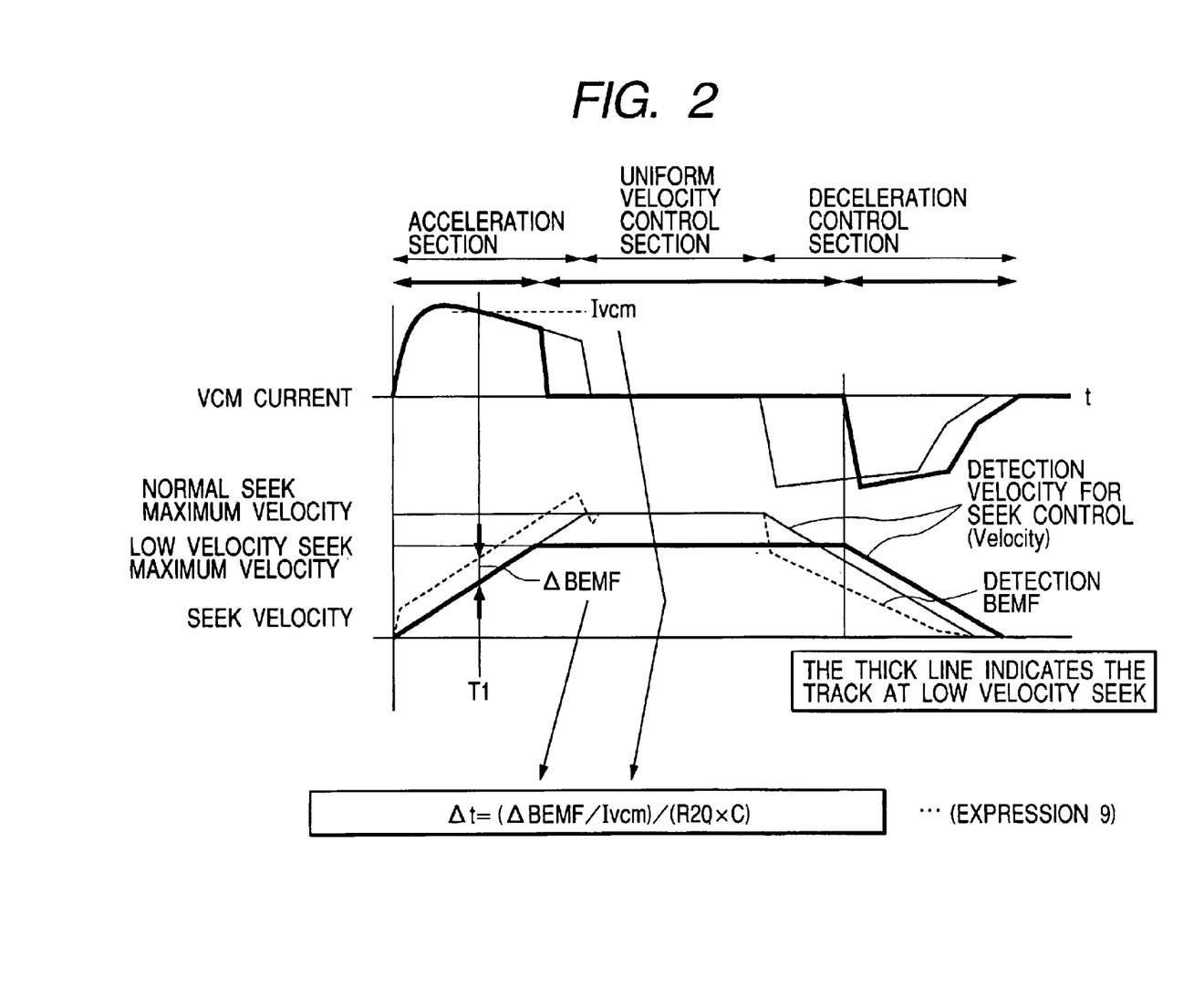
FIG. 2 is a drawing for describing the relationship between the VCM current and seek velocity, and $\Delta$BEMF (1)

FIG. 2 shows the relationship between the VCM current and seek velocity, and ΔBEMF (1).

Figure 3:
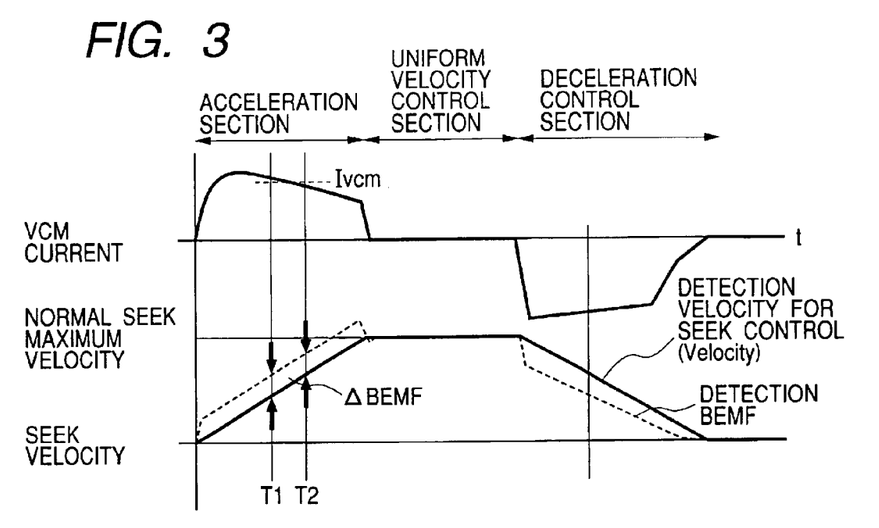
FIG. 3 is another drawing for describing the relationship between the VCM current and seek velocity, and $\Delta$BEMF (2)

FIG. 3 shows the relationship between the VCM current and seek velocity, and ΔBEMF (2).

FIG. 4 shows a magnetic disk and the position information located on it.

In this FIG. 2, as a result of calculating a temperature change Δt from ΔBEMF, the Δt exceeds a specified value and the heat dissipation of the VCM is prevented. Accordingly, the velocity track of the operation in the low velocity seek mode and the trace of the VCM current are shown in bold lines and the trace of the operation in the normal seek mode is shown in thin lines.

In the seek control as shown in FIG. 2, there is a section in which the velocity control facing a target position is started and accelerated, and there is a section that is controlled at uniform velocity when the maximum seek velocity is reached. When the predetermined remaining travel is reached, decelerated control is started and the head is moved to the target position by controlling the velocity so that velocity=0 can be established in the vicinity of the target track. Besides, in the acceleration section, to extract the power supply voltage and the maximum acceleration capability of a mechanism system, in most cases, the VCM current is saturated and the maximum current is supplied. The seek control mechanism is mostly constituted of a velocity control system in this manner. In the velocity detection at that time, the position information (including a track number) arranged at equal intervals in the circumferential direction and radially in the radial direction as shown in FIG. 4.

Specifically, travel is calculated from the difference between the radial position of the current sample and the radial position of the previous sample and the value in which this travel is divided by the time of sample interval Ts is used as a traveling velocity. Accordingly, the velocity calculated in this calculation is the position information on which a magnetic head actually passed through, and this detection method is used when there are extremely small offset and uneven sensitivity.

On the other hand, the calculation of BEMF requires the information about the VCM current and the VCM voltage. As shown in FIG. 1, the VCM current is obtained by detecting a voltage on both ends of a current sense resistor Rs 14 of low resistance inserted into the VCM in series using a VCM current detection AMP 15 that detects this voltage. Besides, in most cases, this AMP 15 is usually incorporated in the VCM AMP.

Also for the VCM voltage, the voltage on both ends of the VCM is detected by a VCM voltage detection AMP 16 in the same manner. The information about these VCM current and VCM voltage is input to the A/D converter 13 respectively. The BEMF, as expressed in (Equation 1), is obtained by multiplying a VCM resistance value Rvcm by the A/D conversion result of a VCM current Ivcm and calculating the difference with the A/D conversion result of the VCM voltage.

The BEMF is calculated in this manner. As described above, the VCM coil resistance has high temperature sensitivity. Accordingly, when the BEMF is calculated in the state containing the error ΔBEMF due to a temperature change, the trace shown in the dotted line of FIG. 2 is formed. In the area to which a high VCM current is supplied, such as the acceleration section or the deceleration section, a waveform having an offset error that is proportional to the amount of VCM current supplied is formed in comparison with the velocity detected during seek control.

Hereupon, as shown in FIG. 2, the difference between the seek control detection velocity and the BEMF at the timing, such as T1 of the acceleration section, that is, ΔBEMF is calculated. Δt, that is, a temperature change can be detected by substituting this for (Equation 9).

Because the VCM current and VCM voltage that become the cause of calculating the BEMF are incorporated into a CPU via the A/D converter 13 of definite resolution, desirably, they are calculated in a section in which the absolute value is high.

The BEMF is expressed in (Equation 1). In consideration with coil inductance, the BEMF is expressed in the following (Equation 10), to be accurate.

$$BEMF=Vvcm-Ivcm \times Rvcm-Lvcm \times dIvcm/dt \qquad \text{(Equation 10)}$$

Where,
Lvcm: VCM coil inductance

As can be understood from this (Equation 10), in the section in which the rate of change of the VCM current Ivcm is high, because the effect of the inductance Lvcm appears in the BEMF, the time variance of the BEMF is high and the BEMF becomes difficult to detect. Accordingly, in the detection of the BEMF, the BEMF can be measured with good accuracy in the area in which the absolute value of the VCM current is high and the rate of change of the VCM current is low. From this viewpoint an acceleration area or a deceleration area is desirable. However, desirably, the BEMF is measured in the acceleration section, because both the VCM current and VCM voltage are stable in the acceleration area in which the VCM current is saturated.

Besides, the measurement may also be made using the average of the section for the fixed time from T1 to T2, as shown in FIG. 3, instead of the single point of the acceleration section as shown in FIG. 2.

Subsequently, the control of seek operation according to the magnetic drive of the present invention is described with reference to FIG. 5.

Figure 5:
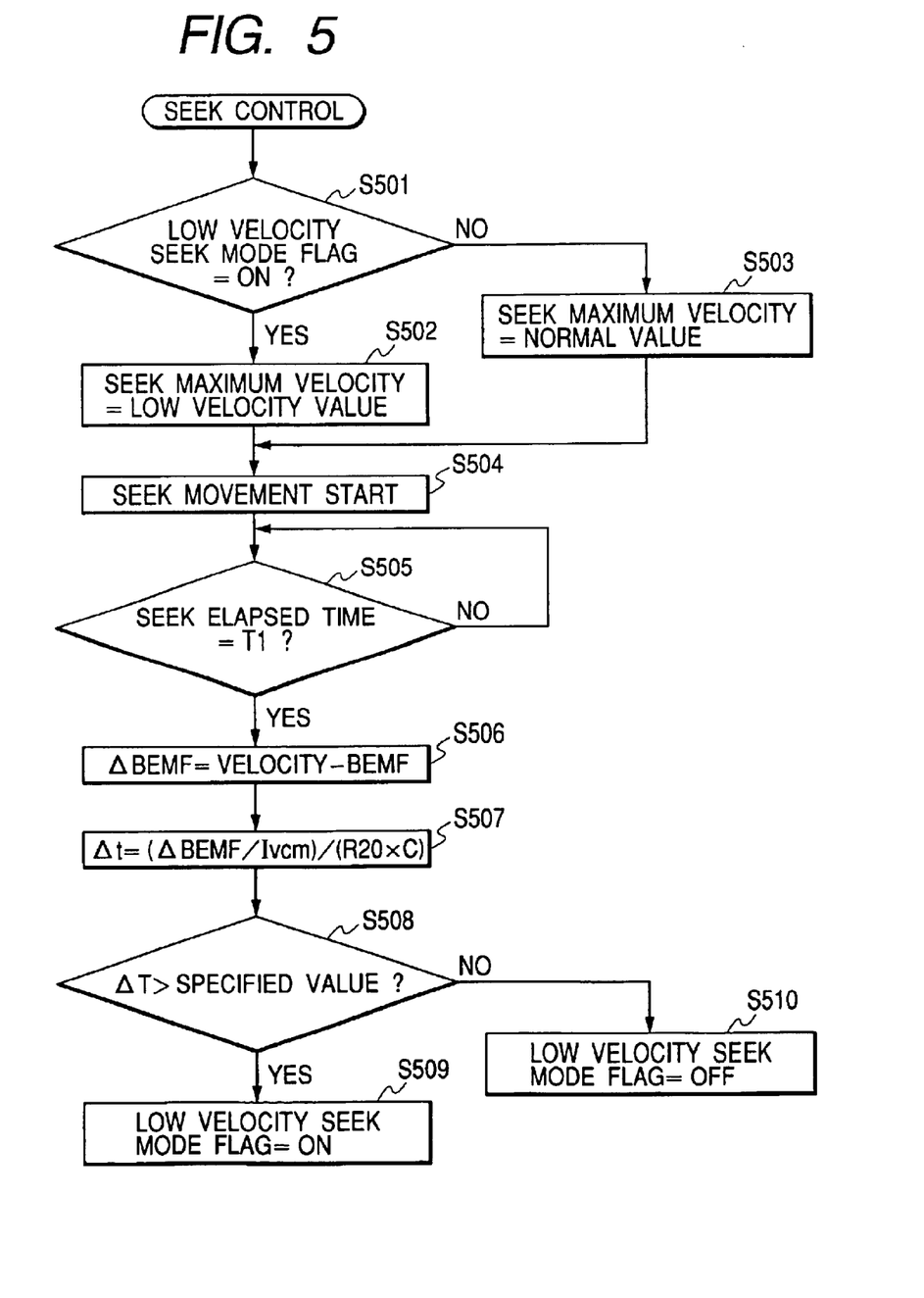
FIG. 5 is a flowchart showing the control procedure of seek operation according to the magnetic disk drive of the present invention.

FIG. 5 is a flowchart showing the control procedure of seek operation according to the magnetic disk drive of the present invention.

First, prior to the start of seek operation, the seek that is executed currently judges whether it should be switched to the low velocity seek mode, and, consequently, the seek maximum velocity data is set. That is, when the low velocity seek mode flag is On (S501), the seek maximum velocity is set to a low velocity value (S502). When the low velocity seek mode flag is Off, the seek maximum velocity is set to a normal value (S503). This low velocity seek mode flag is set to On when Δt exceeds a preset value at previous seek.

Subsequently, when seek control is started (S504) and the seek elapsed time reaches T1, the ΔBEMF is calculated (S505, S506). Subsequently, the Δt is calculated (S507). If the Δt exceeds a preset value (S508), the low velocity seek mode flag is set to On (S509). If it is below the preset value, the low velocity seek mode flag is set to Off (S510).

In case of the operation in the low velocity seek mode, as can be understood from the trace of the thick line VCM current shown in FIG. 2, the heat dissipation of the VCM can be suppressed because the VCM current required for single seek control decreases. The preset value that moves to this low velocity seek mode is set below the VCM coil temperature and the heat resistance temperature of a mechanism system. Further, the condition of returning to the normal seek control mode also includes a method of assuming hysteresis (method of considering the history of the past state), such as the case where the temperature falls short of specified temperature or goes below fixed temperature from the preset temperature.

[Embodiment 2]

A second embodiment according to the present invention is described below with reference of FIG. 6.

Figure 6:
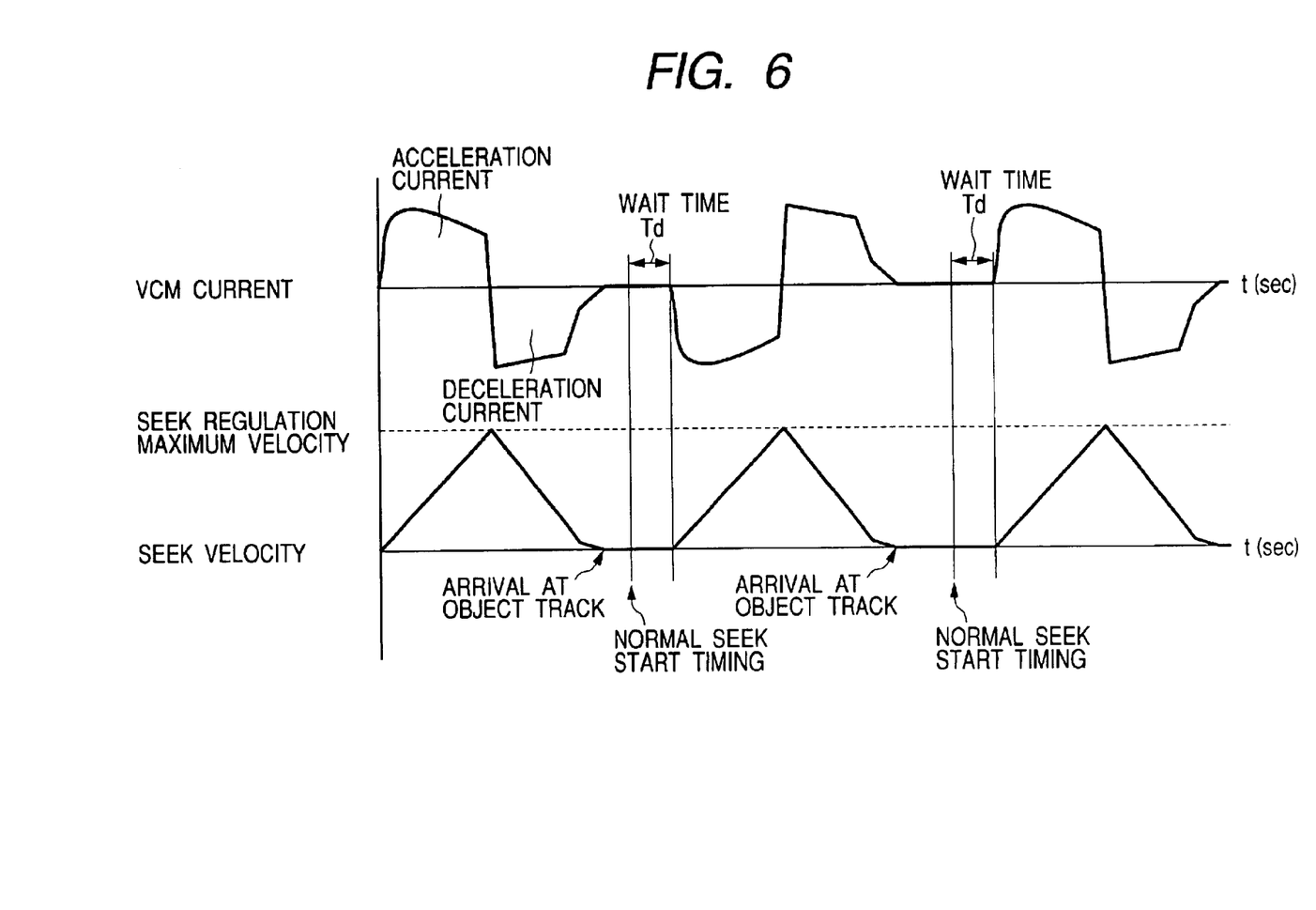
FIG. 6 is a drawing showing the relationship between the VCM current and seek velocity according to a second embodiment of the present invention.

FIG. 6 shows the relationship between the VCM current and seek velocity according to the second embodiment of the present invention.

In the first embodiment, when the Δt that is the estimated temperature of the VCM coil exceeds a preset value, an attempt was made to suppress the heat dissipation of a magnetic disk drive by moving to the low velocity seek mode.

This embodiment prevents the heat dissipation of the VCM by delaying the next seek start at least wait time Td and decreasing the amount of VCM current to be applied within the unit time.

[Embodiment 3]

A third embodiment according to the present invention is described below with reference to FIG. 1.

In the first embodiment, as shown in FIG. 1, the CPU 10 is external. Accordingly, a description is made so that the calculation of BEMF, the detection of seek velocity, and the estimation of VCM coil temperature can be performed. This function is incorporated in the VCM AMP 12 and may also be provided as a chip.

According to the present invention, a magnetic disk drive that performs the seek operation of a magnetic head by the VCM is provided. The magnetic disk drive is excellent in fault tolerance that will not generate a fault even under severe environment such as a high temperature and the issue of high frequency command, by estimating the VCM coil temperature and as a result, moving to the seek control mode that suppresses an excessive temperature rise, without using a special device, such as a temperature sensor, and without requiring special operation for the measurement of the VCM coil temperature, and without deteriorating the access performance.

What is claimed is:

1. A magnetic disk drive, comprising:
   a voice coil motor (VCM) for performing a seek operation that positions a magnetic head in a predetermined track;
   a VCM current detection amplifier (AMP) for measuring the VCM current supplied to said VCM;
   a VCM voltage detection amplifier (AMP) for measuring the VCM voltage applied to both ends of said VCM
   a channel for sampling position information of said magnetic head at said seek operation; and
   a CPU for calculating VCM back electromotive force (BEMF) based on a measurement result by said VCM current detection AMP and said VCM voltage detection AMP,
   detecting the traveling velocity of said magnetic disk from the difference of the position information of a sample result by said channel,
   estimating the coil temperature of said VCM from the difference between the traveling velocity detected and the BEMF calculated by said calculation,
   and moving said VCM at said seek operation when said estimated coil temperature exceeds a specified value.

2. The magnetic disk drive according to claim 1, wherein said CPU moves said VCM at a low velocity seek mode when the estimation value of said VCM coil temperature exceeds a specified value.

3. The magnetic disk drive according to claim 2, wherein said CPU estimates said VCM coil temperature during acceleration at said seek operation.

4. The magnetic disk drive according to claim 1, wherein said CPU inserts wait time between each operation so that said CPU reduces the execution frequency of each seek operation when the estimation value of maid VCM coil temperature exceeded a specified value.

5. The magnetic disk drive according to claim 4, wherein said CPU estimates said VCM coil temperature during acceleration at said seek operation.

6. A magnetic disk drive, comprising
   a voice coil motor (VCM) for performing a seek operation that positions a magnetic head in a predetermined track;
   a means for measuring the VCM current supplied to maid VCM;
   a means for measuring the VCM voltage applied to both ends of said VCM;
   a means for calculating a VCM back electromotive force (BEMF) based on a measurement result by said measurement means;
   a means for sampling position information of maid magnetic head at said seek operation;
   a means for detecting the traveling velocity of said magnetic disk from the difference of the position information of a sample result by said sample means;
   a means for estimating the coil temperature of said VCM from the difference between the traveling velocity detected by said detection means and the BEMF calculated by said calculation means; and
   a means for moving said VCM at a special seek mode when the coil temperature estimated by said estimation means exceeded a specified value.

7. The magnetic disk drive according to claim 6, wherein said movement means moves said VCM at a low velocity seek mode when the estimation value of said VCM coil temperature exceeds a specified value.

8. The magnetic disk drive according to claim 7, wherein said estimation means estimates said VCM coil temperature during acceleration at said seek operation.

9. The magnetic disk drive according to claim 6, wherein said movement means inserts wait time between each seek operation so that said movement means reduces the execution frequency of each seek operation when the estimation value of said VCM coil temperature exceeded a specified value.

10. The magnetic disk drive according to claim 9, wherein said estimation means estimates said VCM coil temperature during acceleration at said meek operation.

11. The magnetic disk drive according to claim 6, wherein said calculation means, said detection means and said estimation means is integrated and mounted in a circuit portion that supplies a current to said VCM.

12. A control method of a magnetic disk drive that performs a seek operation by a voice coil motor (VCM) for positioning a magnetic head in a predetermined track, comprising the steps of:
    measuring the VCM current supplied to said VCM;
    measuring the VCM voltage applied to both ends of said VCM;
    calculating VCM back electromotive force (BEMF) based on the measurement result of said measurement steps;
    sampling positioning information located on a magnetic disk at said seek operation;
    detecting the traveling velocity of said magnetic disk from the difference of the positioning information of the sample result of said sample step;
    estimating the coil temperature of said VCM from the difference between the traveling velocity detected by said detection step and the BEMF calculated in accordance with said calculation step; and
    moving said VCM at a low velocity seek mode when said estimated coil temperature exceeded a specified value.

13. The control method of a magnetic disk drive according to claim 12, wherein said estimation of said temperature of said VCM is executed during acceleration at said seek operation.

14. The control method of a magnetic disk drive according to claim 12,
wherein maid VCM is moved to a low velocity seek mode when the estimation value of said VCM coil temperature exceeds a specified value.

15. The control method of a magnetic disk drive according to claim 14,
wherein said estimation of said temperature of said VCM is executed during acceleration at said seek operation.

16. The control method of a magnetic disk drive according to claim 12,
wherein wait time is inserted between consecutive seek operations so that an execution frequency of seek operation is reduced when said estimation of said temperature of said VCM exceeded a specified value.

17. The control method of a magnetic disk drive according to claim 16,
wherein said estimation of said temperature of said VCM is executed during acceleration at said seek operation.

* * * * *